US006652789B1

(12) United States Patent
Pearson

(10) Patent No.: US 6,652,789 B1
(45) Date of Patent: Nov. 25, 2003

(54) COMPOSITE VENEER

(75) Inventor: Martin Thomas Pearson, Burnaby (CA)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 09/048,087

(22) Filed: Mar. 26, 1998

(51) Int. Cl.[7] .......................... D04H 1/20; B29C 67/00; B28B 5/00

(52) U.S. Cl. ....................... 264/112; 264/113; 264/121; 425/80.1; 425/81.1; 425/83.1

(58) Field of Search ............................... 425/83.1, 81.1, 425/80.1, 82.1; 264/121, 113, 109, 112, 518, 555; 156/62.4, 296

(56) References Cited

U.S. PATENT DOCUMENTS

| | | | | | |
|---|---|---|---|---|---|
| 2,940,134 | A | * | 6/1960 | Heritage | 19/156 |
| 3,115,431 | A | | 12/1963 | Stokes et al. | 264/119 |
| 3,880,975 | A | * | 4/1975 | Lundmark | 264/119 |
| 3,962,753 | A | * | 6/1976 | Dunn | 19/156.3 |
| 3,963,400 | A | * | 6/1976 | Urmanov | 425/224 |
| 4,364,984 | A | * | 12/1982 | Wentworth | 428/106 |
| 4,375,447 | A | * | 3/1983 | Chung | 264/518 |
| 4,380,285 | A | | 4/1983 | Burkner et al. | 198/533 |
| 4,432,714 | A | * | 2/1984 | Forry et al. | 425/83.1 |
| 4,494,919 | A | * | 1/1985 | Knudson et al. | 425/83.1 |
| 4,495,119 | A | * | 1/1985 | Chung | 264/37 |
| 4,627,953 | A | * | 12/1986 | Johnson | 264/518 |
| 5,171,498 | A | * | 12/1992 | Powell | 264/113 |
| 5,202,133 | A | * | 4/1993 | Pesch et al. | 425/83.1 |
| 5,269,049 | A | * | 12/1993 | Gustafsson et al. | 19/304 |
| 5,325,954 | A | * | 7/1994 | Crittenden et al. | 198/382 |
| 5,487,460 | A | | 1/1996 | Barnes | 198/382 |
| 5,718,786 | A | * | 2/1998 | Lindquist et al. | 156/62.2 |
| 5,882,372 | A | * | 3/1999 | Brown et al. | 65/505 |
| 5,885,623 | A | * | 3/1999 | Edvardsson et al. | 425/81.1 |

* cited by examiner

*Primary Examiner*—Paul Thibodeau
*Assistant Examiner*—Kevin R. Kruer
(74) *Attorney, Agent, or Firm*—Kolisch, Hartwell, Dickinson, McCormack & Heuser

(57) ABSTRACT

The method and apparatus for forming composite wood products particularly composite veneer like products which may be intermediate products and laminated to form the final composite product. Strands are fed from a source of supply at a metered rate, entrained in an air stream and carried along a confined path between an entrainment zone and the source of supply. Strands are condensed onto a surface to form a veneer lay-up of at least one layer of strands on the forming surface and this veneer lay-up is carried from the path and deposited onto a collecting surface and later consolidated into a composite product. Entraining air and strands not forming veneer are separated in the supply station, the strands fall onto the supply of strands and energy is added to the separated entraining air and it is returned to the entraining zone.

17 Claims, 5 Drawing Sheets

COMPOSITE VENEER

FIELD OF INVENTION

The present invention relates to a method and apparatus for forming a composite veneer product from wood strands and a composite veneer product so produced

BACKGROUND OF THE INVENTION

Generally, forming systems for making composite products employ formers wherein the strands are deposited onto a forming surface to form a mat of strands on the surface (e.g. a caul plate or the like) that is used in the subsequent pressing or consolidating stage to form the surface on the consolidated product.

In making fiberboard wood fibers (as opposed to wood strands) are cast into the air and deposited on a forming surface by gravity or possibly by suction through the forming surface. See for example, U.S. Pat. No. 3,880,975 issued Apr. 29, 1975 to Lundmark. This technique, i.e. condensing of the material into a mat using a vacuum on the side of the forming wire remote from the supply of material, is applied to form fibrous mats from wood fibers, i.e. very small elements (fibers) relative to strand as used in manufacture of strand board products. Each strands, for example, is composed of thousands of fibers bonded together in their natural state.

The fibers used in the manufacture of fiber board are liberated by some form of mechanical disintegration technique e.g. grinding or refining or chemical technique to separate discrete fibers from one another. In fiberboard manufacture the fibers generally are randomly oriented, though it has been suggested to use electrostatic forces to orient the fibers.

In the manufacture of strand board the strands are dispensed from a source of supply, e.g. a bin, and simply fall onto a collecting surface and depending on the process may or may not be oriented. When an oriented strand board (OSB) is made the strands are oriented to be reasonably parallel to an axis of the consolidated product. See for example, U.S. Pat. No. 3,115,431 issued Dec. 24, 1963 to Stokes et al., U.S. Pat. No. 4,380,285 issued Apr. 19, 1983 to Burkner et al. and U.S. Pat. No. 5,325,954 issued Jul. 5, 1994 to Crittenden et al. or U.S. Pat. No. 5,487,460 issued Jan. 30, 1996 to Barnes, all of which show different devices for laying mats for consolidation wherein the strands are oriented before they pass on to the mat so that the mat contains oriented strands.

A plurality of separate forming heads are generally used to each to form a layer of strands directly onto the surface of a preceding layer of strands to form a lay-up that will consist of at least several such layers formed directly one on top of the other. Each of the layers will be several strand thickness' thick and the combined lay-up will be at least about 7 or 8 strand thickness thick.

It will be apparent that in each of these forming systems, the mat or lay-up formed generally consists of a plurality of strands or fibers piled one on top of the other to form a lay-up mat many strands (or fibers) thick so that the resultant consolidated product produced form from such a strand lay-up mat will have a thickness of at least a quarter inch which corresponds for conventional strandboard forming lay-up mat of about 7 strand thickness (assuming about 30% compression of strands 0.05 inches thick).

As above indicated this strand lay-up mat is made using a plurality of forming heads so that each head produces a layer of about 2 to 4 strands thick It is necessary to make consolidated composite products from a plurality of strand layers i.e. form by a plurality of forming heads forming layers one directly on the top of the other because of the inability of the previously known laying processes to form the mat or lay-up of say a single layer thickness with a sufficiently uniform weight distribution over the area of the consolidated product i.e. when the thickness of the lay-up being consolidated is too small.

BRIEF DESCRIPTION OF THE PRESENT INVENTION

It is an object of the present invention to provide a method and apparatus forming a composite veneer product from strand particularly wood strands.

It is also an object of the present invention to provide a composite product formed from a plurality of composite veneers laminated together into a single layered product.

Broadly, the present invention relates to a method of forming a composite wood veneer product comprising feeding wood strands from a supply of strands in a supply station at a metered rate, entraining said strands in an air stream in an entraining zone and carrying said strands in said air stream along a confined path, forming a. veneer lay-up consisting of at least one layer of strand and less than five layers of strands on a foraminous forming surface communicating with said confined path through a wall defining said confined path by drawing air through said foraminous forming surface in an amount sufficient to hold and distribute said strands on said foraminous forming surface and form said veneer lay-up layer, carrying said veneer lay-up layer so held to said foraminous forming surface from said path, transferring said veneer lay-up layer onto a collecting surface, returning said strands not forming said veneer lay-up layer to said supply station, separating entraining air from said strands, returning at least some said air separated from said strands and of said air drawn through said foraminous forming surface to said entraining zone and returning said strands not forming said veneer lay-up layer to said supply of strands in said supply station.

Preferably, a plurality of different foraminous forming surfaces each form a separate veneer lay-up layer and wherein a plurality of said veneer lay-up layers are piled one on top of the other to form a layered lay-up.

Preferably, said layered lay-up is further processed by consolidation under heat and pressure into a consolidated composite veneer product Preferably, said strands are oriented as they passed onto said foraminous forming surface to form an oriented veneer lay-up layer with strands oriented in a direction substantially parallel to a longitudinal axis of said oriented veneer lay-up layer.

The present invention also broadly relates to a device for forming a composite product comprising a supply source of strands, means for dispensing said strands from said supply source at a metered rate, wall means defining a confined path, a strand entraining zone, means for passing air through said strand entraining zone and said confined path at a velocity sufficient to entrain and transport said strands along said confined path, forming means including at least one movable foraminous forming surface protruding through said wall means, means for drawing air through said foraminous forming surface from a side of said forming surface remote from said path to condense and distribute some of said strands from said path onto said foraminous forming surface to form a composite veneer lay-up layer of a thickness of at least one and not more than five of said strands on said foraminous forming surface, a movable collecting surface, means for transferring said veneer lay-up layer from said forming surface onto said transfer surface, means to separate air from said strands not forming said veneer lay-up layer and duct means for directing air separated by said means to separate to said means for passing air for recirculation through said path, means for directing air drawn through said foraminous forming surface to said means for passing air for recirculation through said path and means for delivering strands not forming said veneer lay-up layer back to said supply source of strands.

Preferably, said wherein said drawing air through said foraminous forming surface comprises dividing flow of air through said foraminous forming surface into at least 3 separate flows each from a different zone which zones are spaced across of said confined path.

Preferably, said separate flows each have essentially same the flow rate.

Preferably, said means for drawing air through said foraminous forming surface includes partition means constructed to direct air flowing through separate zones of said foraminous forming surface space across said confined path along different passages.

Preferably, said orienter is formed by a plurality of laterally spaced wires spaced from and extending along a portion of said foraminous surface exposed within said confined path.

Preferably, said apparatus further includes an orienter positioned in said path in a position so that said strands condensing onto said foraminous forming surface to form said veneer lay-up must pass through and be oriented by said orienter before reaching said foraminous forming surface so said strands forming said veneer lay-up are oriented in a selected direction.

Preferably, said source of strands comprises a bin containing a pile of said strands onto which fresh strands from the processing stage are passed and means for separating air from said strands is positioned in said supply station so that said strands from which said air is separated by said mean for separating air are deposited on the said pile.

Preferably, said forming means will comprise a plurality of said foraminous forming surfaces spaced along said path each of which forms its respective composite veneer lay-up layer.

Broadly the present invention also relates to a composite veneer product comprising a plurality of discreet veneer lay-up layers positioned in face to face relationship and consolidated to form a consolidated laminated composite veneer produce having a density variation of less than 15% on a 1 inch by 1 inch basis.

BRIEF DESCRIPTION OF THE DRAWINGS

Further features, objects, and advantages will be evident from the following detailed description of the preferred embodiments of the present invention taken in conjunction with the accompanying drawings in which.

DESCRIPTION OF THE PREFERRED EMBODIMENTS

Figure 1:
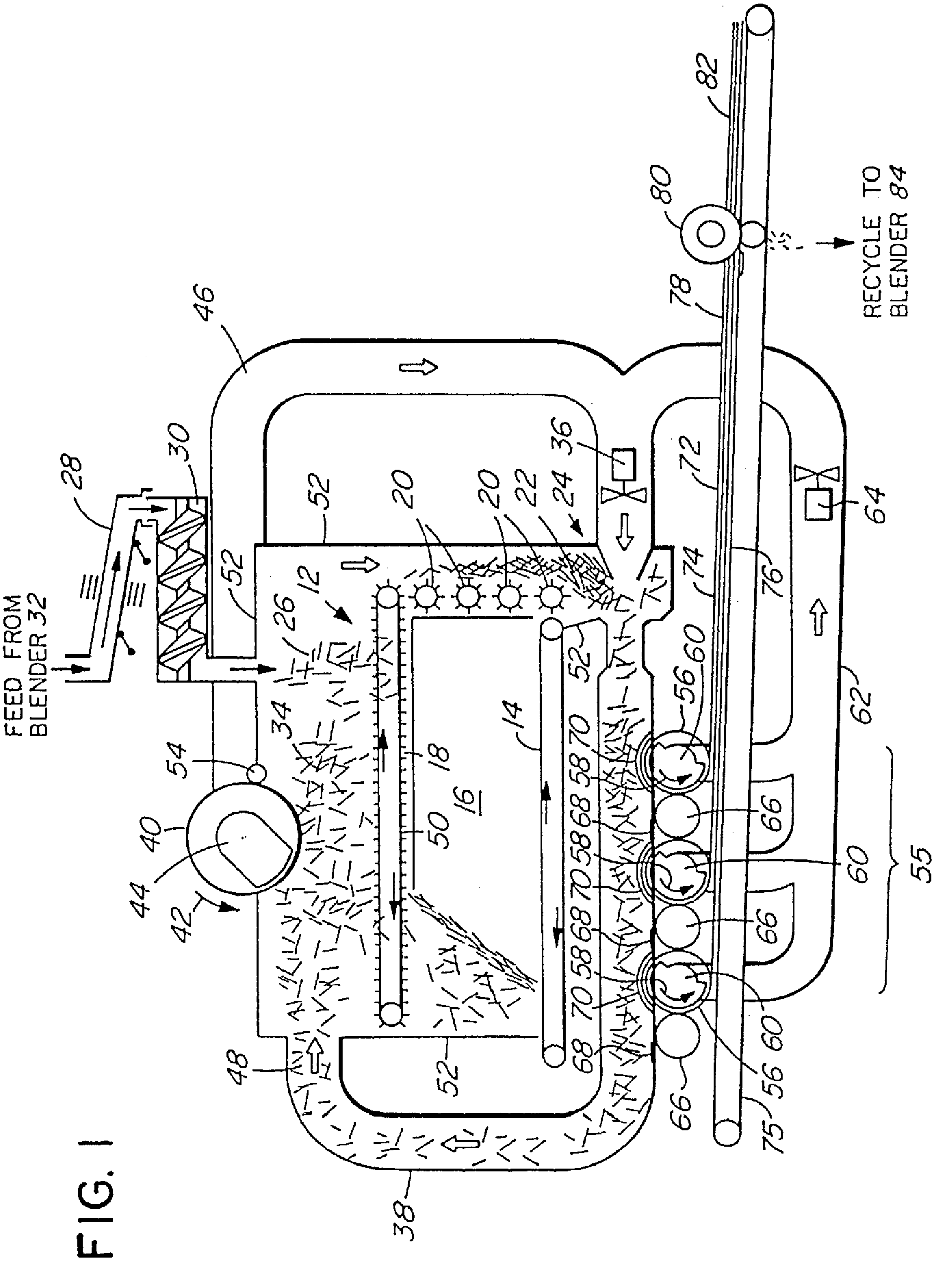
FIG. 1 is a schematic illustration of the method and apparatus used to carry out the present invention.

As shown in FIG. 1, the method and apparatus for forming the composite veneer product from wood strands includes a strand bin 12 which has a live bottom formed by the conveyor 14 and on which a pile of strands 16 is supported. The top of the pile 16 is raked back by a conveyor 18 to maintain the height of the pile 16 at the desired height over a length extending rearward of the discharge end of the pile 16. A plurality of metering rolls 20 sometimes referred to as picker rolls at the discharge end of the pile 16 draw strands as indicated at 22 from the pile 16 and free them to pass or flow or drop into an entrainment zone 24.

The pile of strands 16 in the bin 12 is maintained by incoming strands as indicated at 26 which in the illustrated arrangement are passed via a conveyor system 28 to the bin feeder 30. These strands generally are received from a blender as indicated by the arrow 32 wherein the strands are coated with the appropriate adhesive for subsequent consolidation.

Recirculating strands 34 are returned to the bin 12 to provide another source to keep the bin 12 filled to the required level. The recirculating strands are the strands that are not retained by the forming devices to form the strand lay-up layers and that are separated from the entraining air and returned the pile 16 as will be described further hereinbelow.

The metered supply of strands 22 passes into the entraining zone 24 wherein air is injected via the fan or jet pump 36 and is formed into a venturi type entrainment flow in the zone 24 thereby to entrain the strands and then carry the strands into and through the confined path 38 which in the illustrated arrangement leads from the entrainment zone 24 up to the top of the bin or supply zone 12. This passage 38 will normally be a relatively wide and thin passage to permit the formation of a veneer lay-up layer as will be described hereinbelow, that is wide and relatively thin, i.e. say 4 feet wide by less than about 5 strand thickness' thick generally less than 3 strand thickness thick i.e. less than about ⅛ inch thick per veneer lay-up layer.

In the illustrated arrangement the air and strands entering the supply station 12 from the path 38 are separated via the jet pump drum screen 40 which is rotated as indicated by the arrow 42 and has a suction gland 44 communicating with a return duct 46 that returns separated air to the jet pump 36. The strands 48 that return to the supply station 12 are moved toward the drum 40 in the area defined by the suction gland 44 by the flow of air through gland 44 and then are freed to fall after they pass through the area defined by the fixed gland 44 onto the top surface of the pile 16 in the supply station 12 and provide the recirculated strands 34 that are returned to the pile 16.

It will be apparent that the conveyor 18 has a significant amount of open area and that the strands 34 and 26 may pass directly therethrough onto the pile 16 and may then be swept back by movement of the conveyor 18 rearward as indicated by the arrow 50 relative to the direction of movement of the pile 16.

It will be apparent that the supply station 12 is a sealed box as defined by the wall schematically indicated at 52 and the bottom conveyor 14 as well as the sealing roll 54 so that air may enter the supply station 12 with the returning strands 48 assuming the strands 48 are to be air-veyed to the station 12 or by passing through the drum 40 or by coming in with the fresh strands 26. This flow of entering air will be relatively minimal as the station 12 will not normally be under high vacuum conditions.

Positioned along the path 38 is at least one drum screen or moving foraminous forming surface 56 (in the illustrated arrangement, three such surfaces are shown) each of these foraminous forming surfaces 56 have an annular cross section and rotate as indicated by the arrow 58 around a rotational axis aligned with the axis of the annular cross section of the surface 56. Each of these surfaces protrude into the passage 38 to form a forming zones wherein strands are condensed and distributed uniformly onto the surface 56 by the suction forces applied through suction gland 60 (one in each of the forming screens 56) which apply suction through the screens 56 over a significant portion of their circumference. In the illustrated arrangement the glands 60 extend over approximately 180° of the surface of the drum screen to draw air through the surface 56 over the majority of the travel of the surface 56 through the duct 38 and continue to apply suction through the surface to hold the composite veneer layer being formed to the surface 56 until it reaches the trailing end of the gland 60 at which time the layer falls from the surface onto the collecting surface or conveyor 75 to be described below.

It is preferred to divide the flow of air through each of the surfaces 56 into a plurality of separate air streams each from a separate annular area or zone on the surface 56. The zones or areas are arranged in side by side relationship across the flow path 38 i.e. axially space relative to the rotational axis of the surfaces 56.

Figure 2:
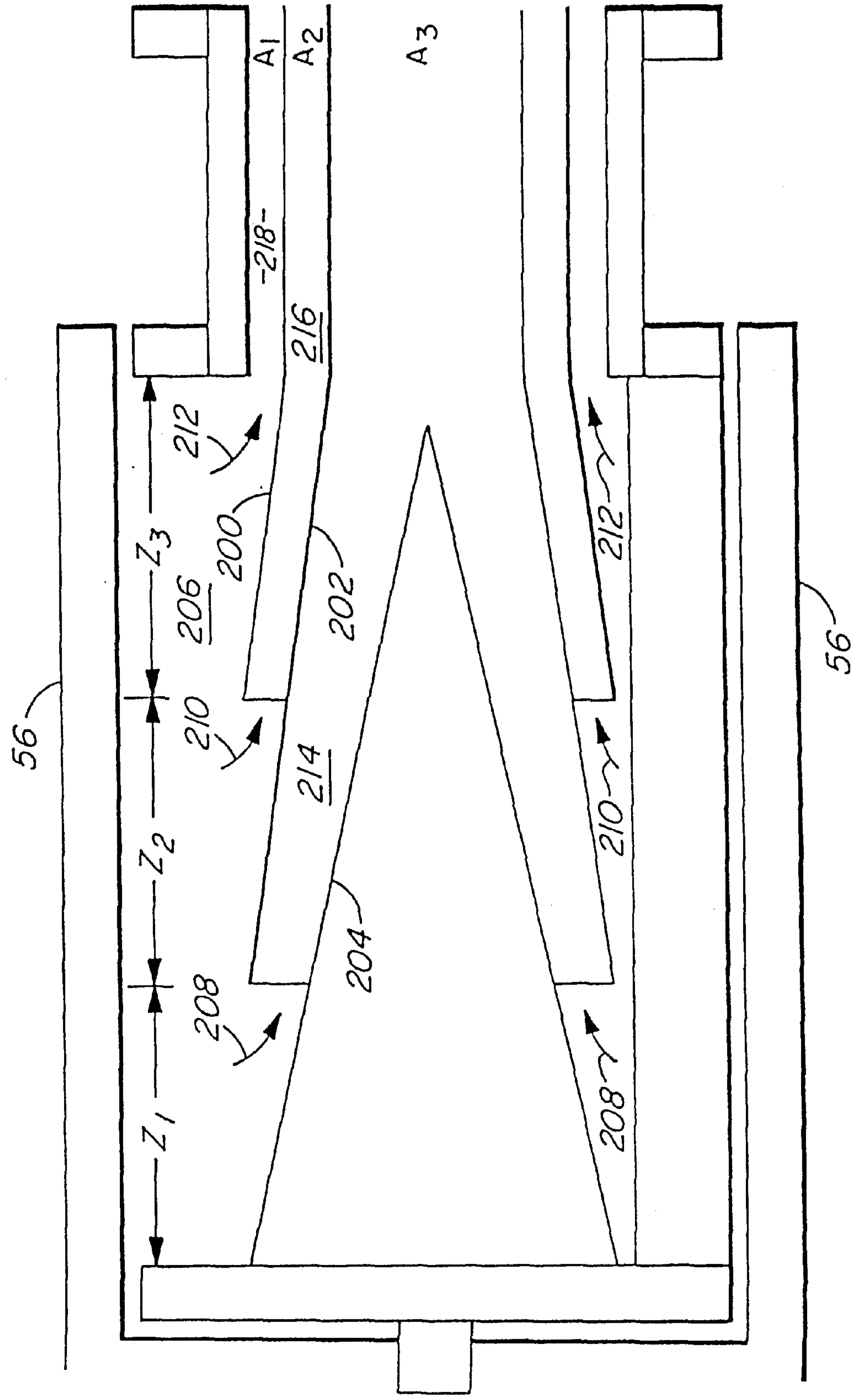
FIG. 2 schematically illustrates a system for dividing the flow from a former into a plurality of flows to reduce channeling.

A suitable system for so dividing the flow is shown schematically in FIG. 2 which shows an arrangement for dividing the flow through the surface 56 into 3 equal flows. This is attained by preferably fixed concentric outwardly flaring (in a direction opposite to the direction of air flow) partitions or baffles 200, 202, 204 positioned within the annular space 206 defined by the surface 56. These partitions divide the air flow into 3 different flows 208, 210 and 212 (more or fewer partitions may be provided depending on the axial length of the surface 56 i.e. width of the passage or path 38) from each of the axial spaced zones $Z_1$, $Z_2$, and $Z_3$ respectively of the surface 56. The partitions define concentric passages 214, 216 and 218 the cross sectional areas as indicated at $A_1$, $A_2$, and $A_3$ respectively are preferably equal i.e. the zones $Z_1$, $Z_2$, and $Z_3$ are of equal area so the air flow though each passage should be the same.

Air is drawn through the glands 60 in drum screens or foraminous surfaces 56 via vacuum fan 64 and is carried via the duct 62 back to the jet pump 36 to be recirculated through the system and thereby aid in entraining the strands in the entrainment zone 24.

Between each of the drum screens 56 is a sealing roll 66 that cooperates with the off-going side of the drum screen 56 and with a portion 68 of the wall of the passage or path 38 to form a seal between the drum screen 56 onto which a composite veneer lay-up layer consisting at least one and generally up to about five strand thickness' is formed and the wall portion 68 to inhibit loss of air from the passage 38.

In the preferred embodiment of the present invention, an orienter as schematically illustrated at 70 of any suitable type known in the art is positioned relative to each of the foraminous forming surfaces 56 within the duct or passage 38 so that the strands passing onto and condensing on the surface of the screen 56 are oriented to form oriented composite veneer lay-up layers 72, 74, 76 and 77 each formed on the three drum screens 56. Veneer layer 72 being formed by the drum screen 56 to the right, veneer layer 74 by the middle drum screen and veneer layer 76 by the drum screen to the left.

Figure 3:
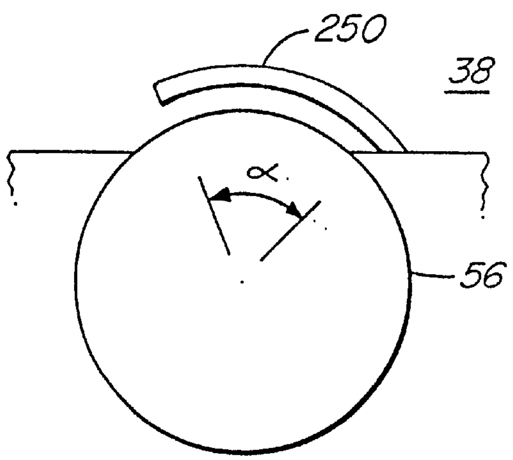
FIG. 3 schematically illustrates a preferred form of orienter for use with the present invention.
Figure 3A:
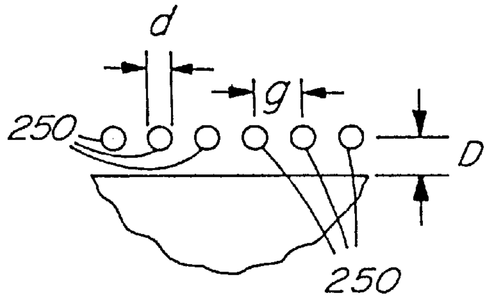
FIG. 3A is a partial cross section of the orienter of FIG. 3 illustrating the construction in more detail.

A preferred form of orienter is schematically shown in FIGS. 3 and 3A and is composed of a plurality of side by side wires 250 that extend from the leading edge of the surface 56 entering the passage 38 over and angle a around the circumference of the surface exposed within the passage 38. An angle α of about 45° has been found to be effective.

The wires 250 as shown each has a circular cross section shape with a diameter d in the range of ⅛ to 1/16 inches, preferably of about 3/32 inches. The wires 250 at about their mid lengths are spaced from the surface 56 by a distance D of less than about ⅛ inch. The spacing 9 between the wire 250 is determined by the size 9 width of the strands being processed and the desired degree of orientation of the strands in the mat being formed. These dimensions may vary depending on the size of the strands being processed and the flow through the duct 38.

The veneer layers 72, 74 76 and 77 in the illustrated arrangement are collected on a collecting conveyor 75 to form a layered veneer lay up mat 78 which is trimmed to size as indicated by the shearing edge 80 to form a trimmed lay up layered mat 82 that is subsequently consolidated in known manner under heat and pressure to form a consolidated composite laminated veneer product.

The strands separated at the edge shearing or trimming station 80 are recycled to the blender 32 or back to the supply source 12 as indicated by the arrow 84.

It will be apparent that, the lay-ups 72, 74 76 and 77 that if desired, a plurality of discreet composite veneer products may be laminated together to form a laminated composite laminated veneer product.

The embodiment shown in FIG. 3, four forming stations have been shown, each composed of a drum screen 56 similar to the one described above. However, in this case, the suction gland 60A used is slightly different than the one shown in FIG. 1 in that the gland 60A extends between the sealing rolls 66 positioned one on each side of the drum screen 56 thereby to seal the passage 38 except for the area of the drum screen 56 projecting into the passage 38. In this arrangement, the height of the passage is reduced as the air and strands are drawn therefrom by the drum screens 56 so that the screen 56 at extreme left (upstream end of the forming section 55) is positioned at the deepest portion of the passage 38 whereas the drum screen 56 at the extreme right (downstream direction of flow of the strands through the passage 38) provides the minimal height of the passage 38 in the forming section 55 as defined by the drum screens 56.

Figure 5:
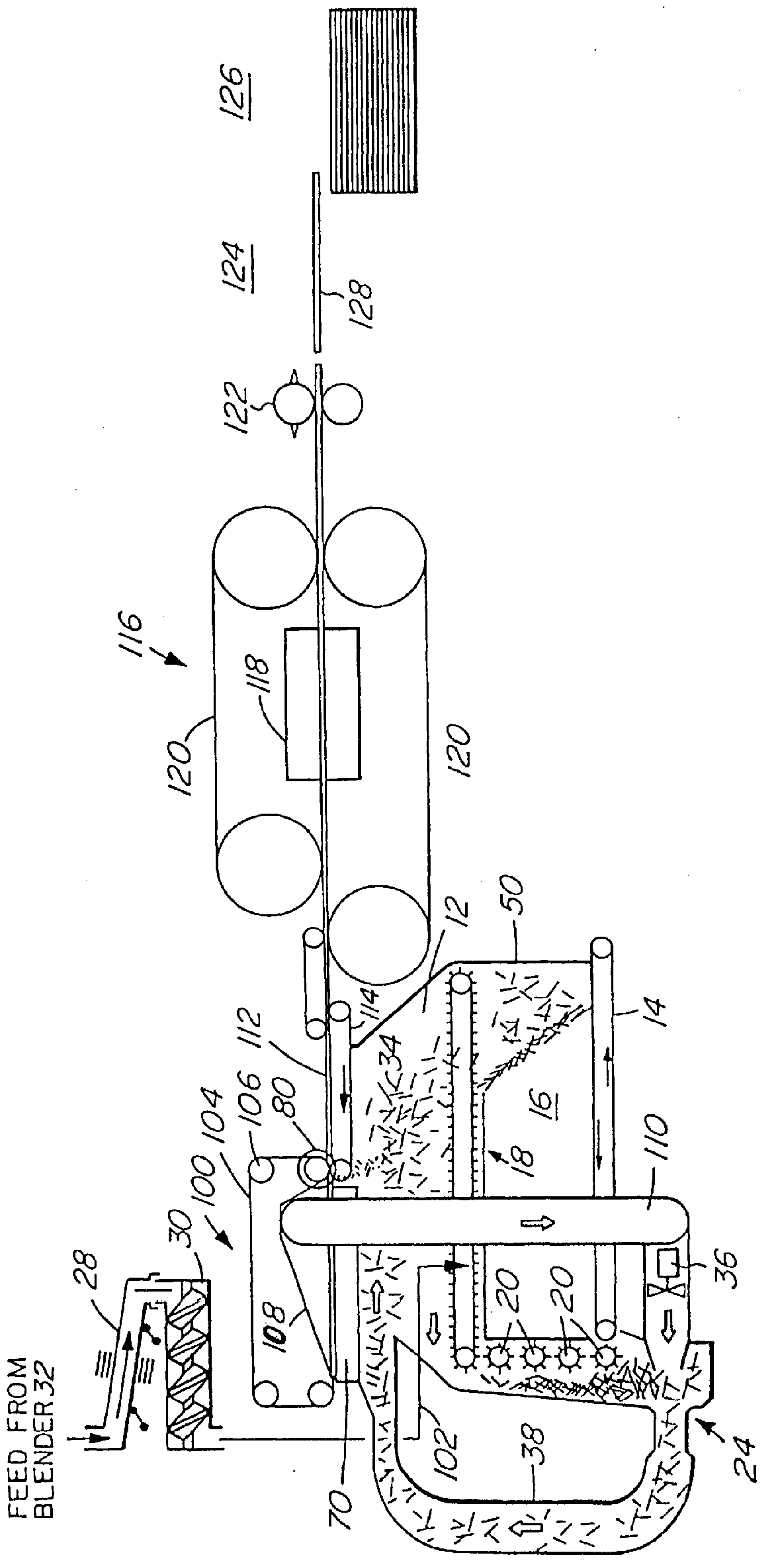
FIG. 5 shows a modified arrangement for forming veneer over a longer area wherein the forming surface also provides the air separation in the supply zone.

FIG. 5 shows a modified version of the device and method of FIG. 1 wherein the forming section 100 replaces the forming section 55 so that the withdrawal of air in the forming section 100 provides return air to the jet pump 36 and so the jet pump provides the vacuum or develops the vacuum for the forming screen 104 onto which the strands are condensed and distributed on the foraminous forming screen 104. In this embodiment fresh strands 26 are introduced as indicated by the arrow 102 into the supply station 12 and the area above the pile 16 in the station 12 and the station 12 forms a continuation of the passage 38 so that the strands 34 are separated from the air in the forming section 100 and those not carried on the screen 104 fall through the conveyor 18 as above described and onto the pile 16, i.e. the foraminous forming surface or screen 104 functions both to form the veneer lay-up layer and replaces the drum screen 40 of the FIG. 1 embodiment.

In this arrangement, the forming section 100 is formed by the screen 104 trained around rolls 106 and passing a suction gland 108 connected via passage 110 to redirect air back to the jet pump 36 after the air has been separated from the strands in the forming section 100. The strands not carried by the screen 104 fall and are recirculated as strands 34 in the supply station 12.

The veneer lay-up 112 so formed is carried by conveyor 114 and is trimmed laterally by in the edge shearing or trimming station 80, i.e. as in the station 80 of the above described embodiment and then to a consolidation zone or station 116 wherein heat is applied as indicated by the heating zone 118 and pressure is applied via the press belts 120 to consolidate the veneer layer product which will be preferably clipped to length as indicated by the clipper 122, cooled as indicated at 124 and stacked as indicated at 126 to form a stack of discrete consolidated composite veneer panels formed from strands, i.e. consolidated composite wood strand veneer products which will generally be less than about ten strands thickness thick. Obviously, the composite veneer produced with this system may be thicker than the veneers layers produced using the embodiment of FIG. 1 since there is a continuous area as defined in the forming station 100 via the gland 108 that is significantly longer than the discrete forming sections of each of the drum screens 56 that are combined within the length of the forming section 55 in FIGS. 1 and 2 embodiment. Thus, the veneer product formed in FIG. 5 may be up to about ten strands thick whereas the veneer layers made using the drum screens 56 will normally not exceed about five strands thick.

It will be apparent that the length of the forming section of the drums 56 is defined by the diameter of the drums 56 and the length of the circumference that projects into the duct 38 and thus may also be made relatively long.

The operation of the two systems is essentially the same except in the FIGS. 1 and 2 embodiment, there are a plurality of discrete forming drums 56 each forming relatively thin veneer lay-up layers whereas the arrangement shown in FIG. 5 the belt 104 is intended to produce a thicker veneer lay-up.

Generally, the systems operate as follows.

Strands, i.e. elongated wood pieces of say up to 0.05 inches thick and up to 6 inches in length up to ½ inch in width are fed from a blender indicated at 32 where they are coated with a suitable adhesive and then passed into the bin 30 to provide a fresh supply of coated strands 26 into the strand supply station 12. The strand supply station is similar to many of the strand supply stations in use in the industry in that the bottom of the bin is alive (conveyor 14) and moves the pile 16 towards the metering picking rolls 20 that pull strands from the pile 16 at a controlled rate so that the free strands may now fall into the entrainment zone 24 where the strands are entrained by high velocity air as generated by the jet pump 36. The strands then are carried in air through the passage 38.

In the FIG. 1 embodiment, some of the strands pass through the orienters 70 and are condensed and distributed uniformly on the screen drums 56 by the flow of air through the foraminous surface 56 to form the veneer lay-up layers 72, 74 76 and 77. The remaining strands are carried via the pipe or path 38 up to the top of the supply station or chamber 12 where they are separated from the entraining air fall onto the top of the pile 16 in station 12. Air carrying these strands is separated in the gland 44 in the jet pump screen and is carried via line 46 to the jet pump 36 while the strands that adhere to the pump screen fall off the screen when they pass the downstream edge of the glad 44 and drop onto the pile 16.

Figure 6:
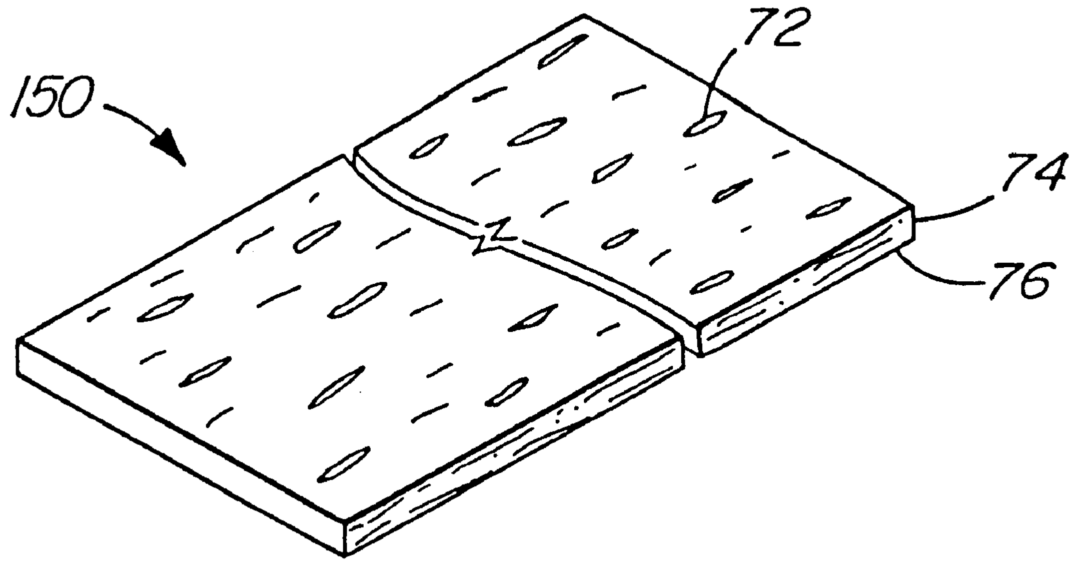
FIG. 6 is an isometric schematic illustration of a layered composite veneer product of the present invention.
Figure 7:
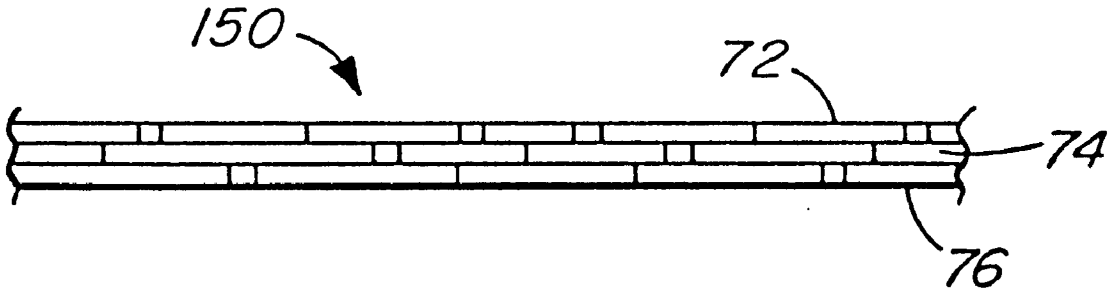
FIG. 7 is a partial section through the composite laminated veneer showing the layers and orientation of the strands relative to the face of the composite veneer in the different layers of the composite product through the thickness of the layered composite veneer.

It will be apparent that air is drawn through the drum screens 56 via the vacuum pump 64 in an amount sufficient to cause condensation and more uniform distribution of the strands forming of layer of strands on the surface of the screens 56 i.e. the composite veneer lay-up layer. This air is returned to the jet pump 36. The lay-up 78 formed on the collecting surface 75 by the combining of the layers 72, 74 76 and 77 after trimming to size, etc. as indicated at 80 to form the sized lay-up 82 is then pressed in a conventional manner in a pressing station such as that indicated at 116 in FIG. 5 to form a consolidated composite veneer product 150 (see FIGS. 6 and 7) consisting of a plurality of the composite veneer lay-up layers 72, 74 and 76 consolidated together.

Figure 4:
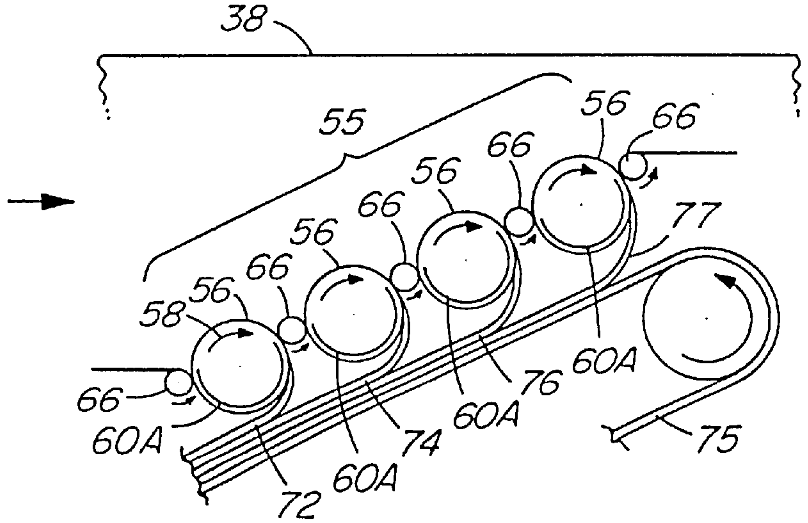
FIG. 4 shows a modified form of the device of FIG. 1.

The FIG. 4 embodiment is essentially the same as FIG. 1 embodiment with the exception of the relationship of the forming screens 56 to the duct or passage 38.

In the FIG. 5 embodiment, a single layer veneer lay-up 112 is formed in the forming station 100 and the station 100 also functions as the air separation means or stage so that no separate vacuum pump is required and the separation drum 40 is not needed.

The composite veneer product 150 or those formed in the FIG. 5 embodiment after cooling and stacking, may be combined to form a composite laminated veneer product by consolidating a plurality of the composite veneers 128 into a laminated veneer product of the appropriate thickness.

In tests carried out using strands as described in Table I.

It will be apparent that for a four layer composite veneer layered product 150, i.e. one containing four veneer lay-up layers, the calculated composite consolidated veneer density variation is on a 1 inch by 1 inch (square inch) basis is less than 15% and in-fact calculates to be about 14% on a square inch bases and on a 6 inch by 6 inch basis calculated to be 3.2%. A product made up to a plurality of such composite laminated veneers to a final thickness of 1½ inches, the density variation on a 1 by 1 basis is less than 5% and on a 6x6 basis, less than 0.7%. It will be apparent that the products of the present invention is very uniform in that its density variation is minimal as compared to other conventional strand board products.

TABLE I

| Composite Veneer (Density Variations) | | |
|---|---|---|
| Strands | | |
| Average wood density | 25.79 lb/ft$^3$ | |
| Wood density variation in strands | 2.19 lb/ft$^3$ | 8.5% C.O.V. |
| Average strand thickness | 0.031 in | |
| Strand thickness variation | 0.005 in | 16% C.O.V |
| Single Air formed Layer of Strands | | |
| Average thickness of one | 1.5 strands | |

TABLE I-continued

| Composite Veneer (Density Variations) | | |
|---|---|---|
| screen layer | | |
| Layer thickness variation | 0.750 strands | 50.0% C.O.V. |
| Wood density variation in one layer | 1.79 lb/ft$^3$ | 6.9% C.O.V. |
| Average thickness of one layer | 0.0465 in | |
| One layer thickness variation | 0.006 in | 13.1% C.O.V. |
| One layer density variation | 28.1% C.O.V. | |
| Multi-layer Composite Veneer | | |
| No. of layers in veneer | 4 strand layers | |
| Average veneer thickness uncompressed | 0.186 in | |
| Average veneer thickness compressed | 0.125 in | |
| Wood compression | 32.8% | |
| Veneer dry wood density | 34.2 lb/ft$^3$ | |
| Composite veneer density variation | | |
| 1" × 1" basis | 14.1% C.O.V. | |
| 6" × 6" basis | 2.3% C.O.V. | |
| Composite Veneer Plywood | | |
| No. of layers of composite veneer | 5.0 veneer layers | |
| 1" × 1" basis | 6.3% C.O.V. | |
| 6" × 6" basis | 1.0% C.O.V. | |
| Compressed thickness | 0.53 in | |
| Product dry wood density | 40.4 lb/ft$^3$ | |
| Laminated Composite Veneer Lumber | | |
| No. of layers of composite veneer | 14.0 veneer layers | |
| 1" × 1" basis | 3.8% C.O.V. | |
| 6" × 6" basis | 0.6% C.O.V. | |
| Compressed thickness | 1.50 in | |
| Product dry wood density | 40.0 lb/ft$^3$ | |

Note:
Aspen example (1" × 1" basis) [bold entries are measured values]

Having described the invention, modifications will be evident to those skilled in the art without departing from the scope of the invention as defined in the appended claims.

I claim:

1. A method of forming a composite wood veneer product comprising, providing a supply of wood strands consisting of a plurality of wood strands in a supply station, dispensing wood strands from said supply station at a metered rate to provide a supply of dispensed strands, entraining said dispensed strands in an air stream in an entraining zone, carrying said dispensed strands in said air stream along a confined path, forming a veneer lay-up by drawing a portion of said air from said air stream through an annular foraminous forming surface in an amount sufficient to hold and distribute a forming portion of said dispensed strands on said foraminous forming surface to form said veneer lay-up while permitting said dispensed strands not forming said veneer lay-up to remain entrained in said air stream as returning strands, said veneer lay-up having a thickness of up to the thickness of five of said wood strands, carrying said veneer lay-up so held to said annular foraminous forming surface from said confined path to provide a formed discrete veneer lay-up layer, transferring said formed veneer lay-up layer from said foraminous forming surface onto a collecting surface, separating air from said returning strands, and depositing said returning strands after separation of said air to said supply of strands in said supply station.

2. A method of forming a composite wood veneer product as defined in claim 1, wherein said annular foraminous forming surface is moving.

3. A method of forming a composite wood veneer product as defined in claim 1, wherein said annular foraminous forming surface is rotating.

4. A method of forming a composite wood veneer product as defined in claim 1 further comprising orienting said strands forming said veneer lay-up as they passed onto said foraminous forming surface whereby said veneer lay-up is an oriented veneer lay-up with its strands oriented in a direction substantially parallel to a longitudinal axis of said oriented veneer lay-up.

5. A method of forming a composite wood veneer product as defined in claim 1 wherein a plurality of steps of forming a veneer lay-up are applied in sequence one at each of up to four forming stations to form a plurality of separate veneer lay-ups one at each of said plurality of separate forming stations and provide a plurality of said veneer lay-up layers each formed from one of said separate veneer lay-ups and piling said veneer lay-up layers of said plurality of said lay-up layers one on top of the other to form a layered lay-up on said collecting surface.

6. A method of forming a composite wood veneer product as defined in claim 5 wherein said strands are oriented as they passed onto said foraminous forming surface to form an oriented veneer lay-up layer with strands oriented in a direction substantially parallel to a longitudinal axis of said oriented veneer lay-up layer.

7. A method of forming a composite wood veneer product as defined in claim 5, wherein at least two of said foraminous forming stations simultaneously apply at least two said formed veneer lay-up layers to said layered lay-up.

8. A method of forming a composite wood veneer product as defined in claim 1 wherein said drawing air through said foraminous forming surface comprises dividing said portion of said air into at least 3 separate flows each of which is withdrawn through a different zone spaced laterally across of said confined path.

9. A method of forming a composite wood veneer product as defined in claim 8 further comprising orienting said strands forming said veneer lay-up as they passed onto said foraminous forming surface whereby said veneer lay-up is an oriented veneer lay-up with its strands oriented in a direction substantially parallel to a longitudinal axis of said oriented veneer lay-up.

10. A method of forming a composite wood veneer product as defined in claim 8 wherein a plurality of steps of forming a veneer lay-up are applied in sequence one at each of a plurality of separate forming stations to form a plurality of separate veneer lay-ups one at each of said plurality of separate forming stations and provide a plurality of said veneer lay-up layers each formed from one of said separate veneer lay-ups and piling said veneer lay-up layers of said plurality of said lay-up layers one on top of the other to form a layered lay-up on said collecting surface.

11. A method of forming a composite wood veneer product as defined in claim 10 wherein said strands are oriented as they passed onto said foraminous forming surface to form an oriented veneer lay-up layer with strands oriented in a direction substantially parallel to a longitudinal axis of said oriented veneer lay-up layer.

12. A method of forming a composite wood veneer product as defined in claim 8 wherein said at least 3 separate flows each have the same flow rate.

13. A method of forming a composite wood veneer product as defined in claim 12 further comprising orienting said strands forming said veneer lay-up as they passed onto said foraminous forming surface whereby said veneer lay-up is an oriented veneer lay-up with its strands oriented in a direction substantially parallel to a longitudinal axis of said oriented veneer lay-up.

14. A method of forming a composite wood veneer product as defined in claim 12 wherein a plurality of steps of forming a veneer lay-up are applied in sequence one at each of a plurality of separate forming stations to form a plurality of separate veneer lay-ups one at each of said plurality of separate forming stations and provide a plurality of said veneer lay-up layers each formed from one of said separate veneer lay-ups and piling said veneer lay-up layers of said plurality of said lay-up layers one on top of the other to form a layered lay-up on said collecting surface.

15. A method of forming a composite wood veneer product as defined in claim 14 further comprising orienting said strands forming said veneer lay-up as they pass onto said foraminous forming surface whereby said veneer lay-up is an oriented veneer lay-up with its strands oriented in a direction substantially parallel to a longitudinal axis of said oriented veneer lay-up.

16. A method of forming a composite wood veneer product as defined in claim 14 wherein said layered lay-up is further processed by consolidation under heat and pressure into a consolidated composite veneer product.

17. A method of forming a composite wood veneer product as defined in claim 16 further comprising orienting said strands forming said veneer lay-up as they pass onto said foraminous forming surface whereby said veneer lay-up is an oriented veneer lay-up with its strands oriented in a direction substantially parallel to a longitudinal axis of said oriented veneer lay-up.

* * * * *